United States Patent
Huo

(10) Patent No.: US 7,197,024 B2
(45) Date of Patent: Mar. 27, 2007

(54) TELECOMMUNICATIONS SYSTEM HAVING LAYERED PROTOCOL WITH DELIMITER OF PAYLOAD

(75) Inventor: David Huo, Newton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 675 days.

(21) Appl. No.: 09/893,363

(22) Filed: Jun. 27, 2001

(65) Prior Publication Data
US 2003/0002532 A1    Jan. 2, 2003

(51) Int. Cl.
*H04Q 7/24* (2006.01)
(52) U.S. Cl. .................. 370/338; 370/473; 370/474
(58) Field of Classification Search ........... 370/469, 370/470, 473, 474
See application file for complete search history.

(56) References Cited

U.S. PATENT DOCUMENTS

| | | | | |
|---|---|---|---|---|
| 4,885,564 | A | 12/1989 | Vercellotti et al. | 340/310 |
| 5,568,476 | A | 10/1996 | Sherer et al. | 370/60 |
| 5,801,757 | A | 9/1998 | Saulsbury | 348/17 |
| 5,970,068 | A | 10/1999 | Gray et al. | 370/395 |
| 6,034,951 | A | 3/2000 | Du | 370/328 |
| 6,088,346 | A | 7/2000 | Du et al. | 370/338 |
| 6,172,990 | B1 | 1/2001 | Deb et al. | 370/474 |
| 6,359,877 | B1* | 3/2002 | Rathonyi et al. | 370/349 |
| 6,765,885 | B2* | 7/2004 | Jiang et al. | 370/328 |
| 2002/0001296 | A1* | 1/2002 | Lee et al. | 370/338 |
| 2002/0024972 | A1* | 2/2002 | Yi et al. | 370/470 |
| 2002/0196760 | A1* | 12/2002 | Malomsoky et al. | 370/338 |
| 2004/0196861 | A1* | 10/2004 | Rinchiuso et al. | 370/441 |

FOREIGN PATENT DOCUMENTS

| | | |
|---|---|---|
| EP | 1 180 878 | 2/2002 |
| WO | WO 00/21253 | 4/2000 |

OTHER PUBLICATIONS

TSG-RAN Working Group 2 (Radio layer 2 and Radio layer 3), TSGR2#4(99)405, Piggybacking of Status Information in RLC, Berlin, May 25-28, 1999.*
Technical Report for the Third Generation Partnership Project; Technical Specification Group GSM EDGE Radio Access Network; General Packet Radio Service (GPRS): Mobile Station (MS)—Base Station System (BSS) Interface; Radio Link Control/Medium Access Control (RLC/MAC) Protocol, (Release 1999), pp. 1-305, 3 GPP™, Valbonne, France.
"3rd Generation Partnership Project; Technical Specification Group GSM Edge Radio Access Network; General Packet Radio Service (GPRS); Mobile Station (MS)—Base Station System (BSS) Interface; Radio Link Control/Medium Access Control (RLC/MAC) Protocol (Release 4)," 3GPP TS 44.060, V4.1.0, Apr. 2001, pp. 1-326.
"3rd Generation Partnership Project; Technical Specification Group Radio Access Network; RLC Protocol Specification (Release 1999)," 3GPP TS 25.322, V3.6.0, Mar. 2001, pp. 1-56.

* cited by examiner

*Primary Examiner*—Chau Nguyen
*Assistant Examiner*—Rhonda Murphy

(57) ABSTRACT

A telecommunications system can include a network device with a layered protocol architecture for allowing transfer of upper layer Protocol Data Units using a shared medium. A data block includes a plurality of Protocol Data Units and a data block header, which includes a delimiter as a length indicator (LI). Any last protocol data unit of the data block has no delimiter. When a Protocol Data Unit fills the balance of the data block, the length indicator is zero having no data for a first link indicator in any next in sequence data block.

21 Claims, 8 Drawing Sheets

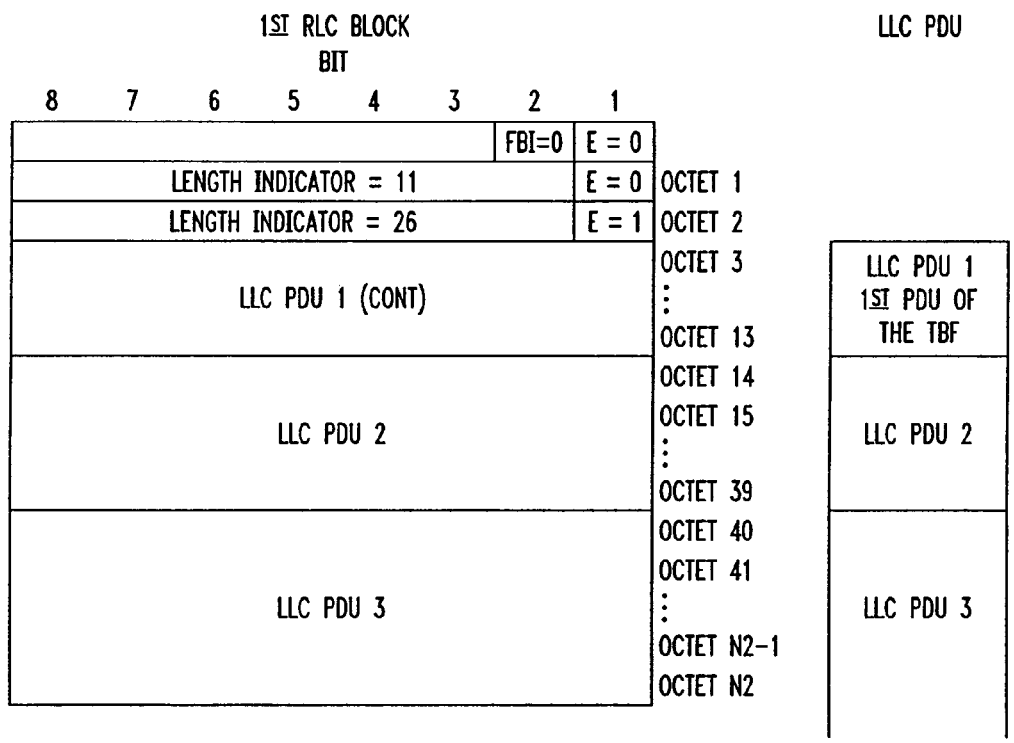

AT THE END OF A TBF
RLC BLOCK WITH BSN=0 MOD SNS IN TBF

EXAMPLES FOR DELIMITATION OF LLC PDU IN EGPRS RLC DATA BLOCK
(DOWN-LINK)

FIRST 2 RLC BLOCKS OF A TBF

| 1ST RLC BLOCK | | | | | | | | LLC PDU | |
|---|---|---|---|---|---|---|---|---|---|
| BIT | | | | | | | | | |
| 8 | 7 | 6 | 5 | 4 | 3 | 2 | 1 | | |
| | | | | | | FBI=0 | E = 0 | | |
| LENGTH INDICATOR = 11 | | | | | | E = 0 | OCTET 1 | | |
| LENGTH INDICATOR = 26 | | | | | | E = 1 | OCTET 2 | | |
| | | | | | | | OCTET 3 | | |
| LLC PDU 1 (CONT) | | | | | | | ... LLC PDU 1 1ST | | |
| PDU OF THE TBF | | | | | | | | | |
| | | | | | | | OCTET 13 | | |
| | | | | | | | OCTET 14 | | |
| | | | | | | | OCTET 15 | | |
| LLC PDU 2 | | | | | | | ... LLC PDU 2 | | |
| | | | | | | | OCTET 39 | | |
| | | | | | | | OCTET 40 | | |
| | | | | | | | OCTET 41 | | |
| LLC PDU 3 | | | | | | | ... LLC PDU 3 | | |
| | | | | | | | OCTET N2-1 | | |
| | | | | | | | OCTET N2 | | |

FIG. 5B

| 2ND RLC BLOCK OF THE TBF | | | | | | | | | |
|---|---|---|---|---|---|---|---|---|---|
| BIT | | | | | | | | | |
| 8 | 7 | 6 | 5 | 4 | 3 | 2 | 1 | | |
| | | | | | | FBI=0 | E = 0 | | |
| LENGTH INDICATOR = 11 | | | | | | | E = 0 | OCTET 1      LLC | |
| PDU 3 | | | | | | | | | |
| LENGTH INDICATOR = 26 | | | | | | | E = 1 | OCTET 2 | |
| | | | | | | | | OCTET 3 | |
| LLC PDU 3 (CONT) | | | | | | | | ... | |
| | | | | | | | | OCTET 13 | |
| | | | | | | | | OCTET 14 | |
| | | | | | | | | OCTET 15 | |
| LLC PDU 4 | | | | | | | | ... LLC PDU 4 | |
| | | | | | | | | OCTET 39 | |
| | | | | | | | | OCTET 40 | |
| | | | | | | | | OCTET 41 | |
| LLC PDU 5 | | | | | | | | ... LLC PDU 5 | |
| | | | | | | | | OCTET N2-1 | |
| | | | | | | | | OCTET N2 | |
| | | | | | | | | | |
| | | | | | | | | | |

FIG. 6A

LAST 3 RLC BLOCKS OF A TBF THAT HAS N BLOCKS

| RLC BLOCK WITH BSN=N-2 | | | | | | | | | |
|---|---|---|---|---|---|---|---|---|---|
| BIT | | | | | | | | | |
| 8 | 7 | 6 | 5 | 4 | 3 | 2 | 1 | | |
| | | | | | | FBI=0 | E = 0 | OCTET 1 | LLC PDU J+1 |
| LENGTH INDICATOR = N2-13 | | | | | | | E = 1 | OCTET 2 | |
| | | | | | | | | OCTET 3 | |
| LLC PDU J+1 (CONT) | | | | | | | | ... | |
| | | | | | | | | OCTET N2-11 | |
| | | | | | | | | OCTET N2-10 | |
| LLC PDU J+2 | | | | | | | | ... | LLC PDU J+2 |
| | | | | | | | | OCTET N2 | |

FIG. 6B

| RLC BLOCK WITH BSN=N-1 | | | | | | | | | |
|---|---|---|---|---|---|---|---|---|---|
| BIT | | | | | | | | | |
| 8 | 7 | 6 | 5 | 4 | 3 | 2 | 1 | | |
| | | | | | | FBI=0 | E = 0 | OCTET 1 | |
| LENGTH INDICATOR = 0 | | | | | | | E = 0 | OCTET 2 | |
| LENGTH INDICATOR = 8 | | | | | | | E = 1 | OCTET 3 | |
| | | | | | | | | OCTET 4 | LLC PDU J+3 |
| LLC PDU J+3 | | | | | | | | ... | |
| | | | | | | | | OCTET 11 | |
| | | | | | | | | OCTET 12 | |
| LLC PDU J+4 | | | | | | | | ... | LLC PDU J+4 |

FIG. 6C

| RLC BLOCK WITH BSN=N | | | | | | | | | |
|---|---|---|---|---|---|---|---|---|---|
| BIT | | | | | | | | | |
| 8 | 7 | 6 | 5 | 4 | 3 | 2 | 1 | | |
| | | | | | | FBI=1 | E = 0 | OCTET 1 | |
| LENGTH INDICATOR = 0 | | | | | | | E = 0 | OCTET 2 | |
| LENGTH INDICATOR = 6 | | | | | | | E = 0 | OCTET 3 | |
| LENGTH INDICATOR = 11 | | | | | | | E = 0 | OCTET 4 | |
| LENGTH INDICATOR = 127 | | | | | | | E = 1 | OCTET 5 | |
| | | | | | | | | OCTET 6 | LLC |
| PDU J+5 | | | | | | | | | |
| LLC PDU J+5 | | | | | | | | ... | |
| | | | | | | | | OCTET 11 | |
| | | | | | | | | OCTET 12 | |
| LLC PDU J+6 | | | | | | | | ... | LLC PDU J+6 |
| | | | | | | | | OCTET 22 | |
| | | | | | | | | | |
| | FILLING OCTETS | | | | | | | | |
| | | | | | | | | OCTET N2 | |

FIG. 7

EXAMPLE 3: A TBF CONSISTS OF ONE LLC PDU

| BIT | | | | | | | | | |
|---|---|---|---|---|---|---|---|---|---|
| 8 | 7 | 6 | 5 | 4 | 3 | 2 | 1 | | |
| | | | | | | FBI=1 | E = 0 | OCTET 1 | |
| | | | | | | | | OCTET 2 | LLC PDU 1 |
| LLC PDU 1 | | | | | | | | ... | |
| | | | | | | | | OCTET N2 | LAST OCTET |

TELECOMMUNICATIONS SYSTEM HAVING LAYERED PROTOCOL WITH DELIMITER OF PAYLOAD

FIELD OF THE INVENTION

This invention relates to the field of telecommunications, and more particularly, this invention relates to telecommunications systems having length indicators for data payloads used in layered telecommunications protocols.

BACKGROUND OF THE INVENTION

In the Global System for Mobile Communications/Enhanced General Packet Radio Service (GSM/EGPRS) Base Station System (BSS) protocol between the LLC (Logical Link Control) and RLC/MAC (Radio Link Control/Medium Access Control), the payload LLC Protocol Data Unit (PDU) is carried within the RLC data block, which has a fixed length. From a spectrum efficiency point of view, it is desirable to fill the RLC data block as far as possible. Therefore, delimiting these LLC Protocol Data Units (PDUs) within the RLC data block is necessary. RLC header Length Indicators (LI) are given in octets, depending on how many LLC PDU are carried in the same RLC data block. Similar problems occur in other protocol stacks, whether using an Open Systems Interconnection (OSI) or other common protocol stack known to those skilled in the art.

As an example of a delimiter problem, a special case occurs when the last LLC PDU fills the remaining octets of the RLC data block precisely. As a result, adding the LI octet would take the protocol data unit out of the RLC data block boundary, requiring another RLC block to carry the rest of the LLC PDU. In this case, two delimiters are required for one LLC PDU. This is a waste of capacity and may cost spectrum when services requiring a short Temporary Block Flow (TBF) is supported, such as with an internet application.

SUMMARY OF THE INVENTION

It is therefore an object of the present invention to provide a telecommunications system that uses an interface and layered protocol architecture that overcomes the disadvantages as described above.

A telecommunications system includes a network device with a layered protocol architecture for allowing transfer of upper layer Protocol Data Units using a shared medium where a data block includes a plurality of Protocol Data Units (PDU) and a data block header, which includes a delimiter as a length indicator (LI). Any last Protocol Data Unit of the data block has no delimiter. When a last Protocol Data Unit fills the balance of the data block, the Length indicator is zero having no data for a first length indicator in any next in sequence data block.

The present invention can be used with any telecommunications system. In one aspect of the invention, the interface is a radio interface. The layered protocol architecture allows transfer of upper layer Protocol Data Units using a shared medium between a communications units and a telecommunications network device. The layered protocol architecture is operative for coding and transferring Protocol Data Units as a plurality of Radio Link Control data blocks that each carry at least one Logical Link Control Protocol Data Unit (LLC PDU) and a data block header that includes a delimiter as a Length Indicator (LI). Any last logical link control Protocol Data Unit of a radio link control data block has no delimiter and when a last Logical Link Control Protocol Data Unit fills the balance of the Radio Link Control data block, the Length Indicator is zero having no data for a first length indicator in any next in sequence radio link control data block.

BRIEF DESCRIPTION OF THE DRAWINGS

Other objects, features and advantages of the present invention will become apparent from the detailed description of the invention which follows, when considered in light of the accompanying drawings in which:

FIGS. 2A, 2B, 2C, 3A, 3B and 4 are examples for delimitation of a Logical Link Control Protocol Data Unit in a Radio Link Control data block as an example of the present invention as a downlink block.

FIGS. 5A, 5B, 6A, 6B, 6C and 7 are examples similar to FIGS. 2A, 2B, 3A, 3B, 3C and 4.

DETAILED DESCRIPTION OF THE PREFERRED EMBODIMENTS

Figure 1:
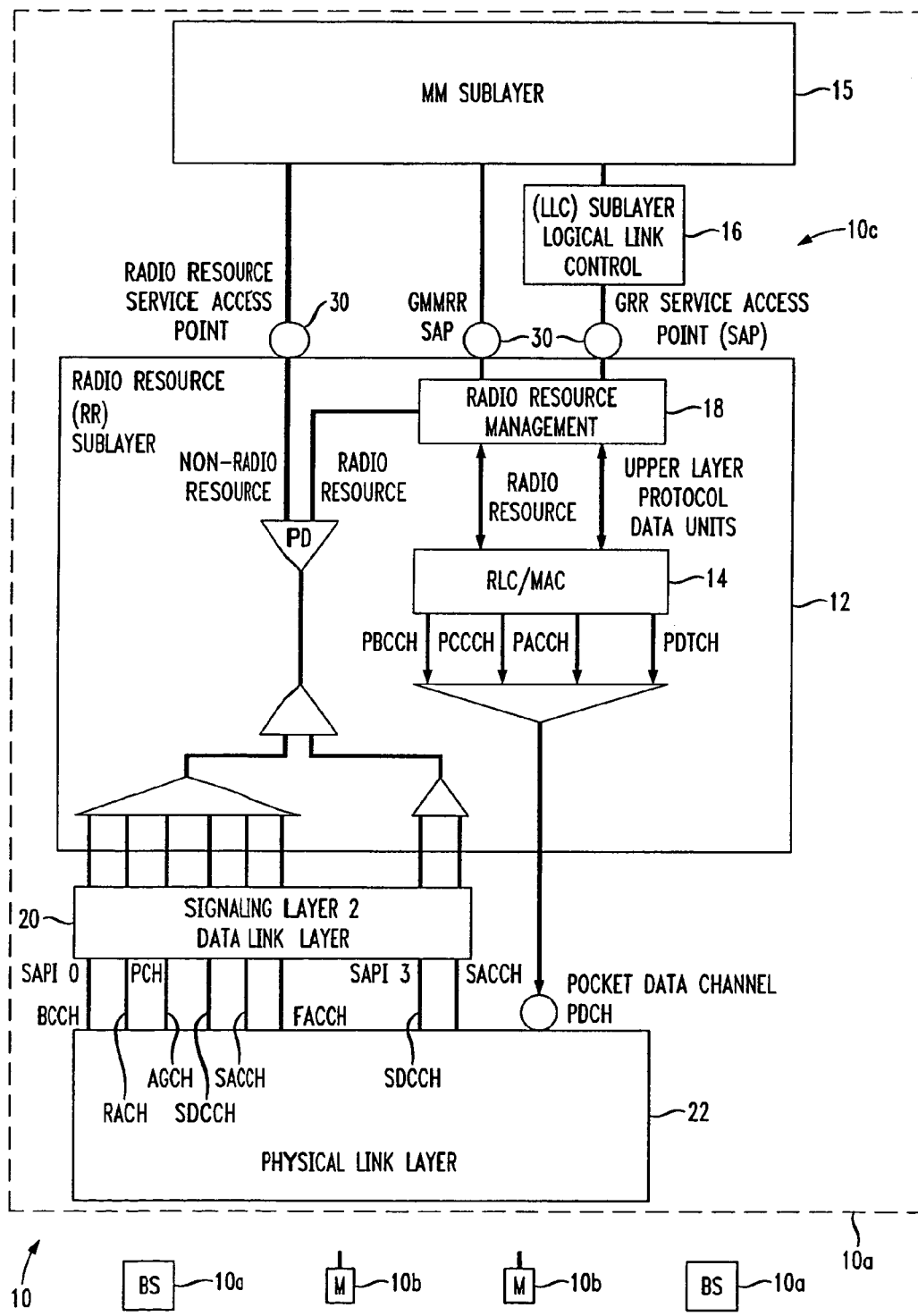
FIG. 1 is a schematic block diagram of an exemplary telecommunications system where telecommunication devices as base stations have a radio interface and layered protocol architecture and operative for coding and transferring Protocol Data Units as data blocks that can incorporate the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The example embodiments will be described relative to a radio link interface used with a wireless mobile network for mobile transmissions as a non-limiting example, using a stacked architecture, such as a Radio Link Control and Medium Access Control function. It should be understood, however, that the present invention is applicable to any arbitrary protocol stack having contiguous upper and lower layers. This would include the standard Open Systems Interconnection (OSI) and other common protocol stacks as known to those skilled in the art.

Protocol Data Units can be delimited in order to be stacked in a lower protocol payload. A length indicator is used such that no data is received in the length indicator under specified conditions. The GSM/GPRS standard is described below as an exemplary use of the present invention, where a Logical Link Control is an upper protocol layer, and a Radio Link Control is a lower protocol layer. Further details of a general protocol description for use in telecommunication protocols is found in the well-known book, *Computer Networks*, $3^{rd}$ edition, by Andrew S. Tanenbaum, the disclosure which is hereby incorporated by reference to its entirety.

The present invention is advantageous relative to a radio interface, in accordance with the GSM standard, and provides a solution where Logical Link Control Protocol Data Units (LLC PDUs) within the Radio Link Control (RLC) data block are delimited for efficiency. The last Logical Link Control Protocol Data Unit would require no delimiter. When the last Logical Link Control Protocol Data Unit fills the balance of the Radio Link Control data block, then the length indicator equals zero, as the first length indicator in the next N sequence radio link control data block. This simplifies the rule for delimiter functions and saves one octet in case the last (segment of) the Logical Link Control Protocol Data Unit fills exactly within the Radio Link Control data block. This principle can apply to all situations where layered protocols are used and the delimiter payload is required.

For purposes of illustration and understanding, a basic radio interface with sublayers is described, followed by the conventional Global System for Communications/Enhanced General Packet Radio Surface (GSM/EGPRS) Base Station System (BSS) protocol between the Logical Link Control and Radio Link Control/Medium Access Control (RLC/MAC), using a standard payload Logical Link Control Protocol Data Unit (LLC PDU) as a non-limiting example. This is carried within the Radio Link Control data block using a fixed link. Throughout the foregoing description, basic terms are described and their application and functions to a basic telecommunications system such as a wireless network. A description and examples of the present invention then follow.

Further background details can be found in the Technical Report for the Third Generation Partnership Project; Technical Specification Group GSM EDGE Radio Access Network; General Packet Radio Service (GPRS); Mobile Station (MS)—Base Station System (BSS) Interface; Radio Link Control/Medium Access Control (RLC/MAC) Protocol, released in 1999, and developed by the Third Generation Partnership Project (3 GPP™), 650 Route des Lucioles-Sophia Antipolis, Valbonne, France, 2001, the disclosure of which is hereby incorporated by reference in its entirety.

FIG. 1 illustrates at 10 a telecommunications system having a plurality of network devices 10a and communications device 10b, such as respective base stations and mobile units, forming a wireless network as a non-limiting example. The network devices 10a (and communications devices 10b) use a protocol architecture shown at 10c, including a Radio Resource (RR) sublayer 12 and a Radio Link Control/Medium Access Control function 14. The architecture 10c illustrates management of packet data physical channels with the Radio Link Control and Medium Access Control (RLC/MAC) on a packet data physical channel. The RR sublayer 12 provides services to an MM sublayer 15 and Logical Link Control sublayers 16, as known to those skilled in the art. The Radio Resource sublayer 12 includes a Radio Resource Management function 18 and interconnects with the Signaling Layer 2, Data Link Layer 20 and the Physical Link Layer 22 via various channels, such as the Broadcast Control Channel (BCCH), Random Access Channel (RACH), access grant channel (AGCH), and other channels as known to those skilled in the art.

The Radio Link Control/Medium Access Control function 14 is also operative with the Physical Link Layer 22 via various packet channels, such as the packet broadcast control channel (PBCCH), packet associated control channel (PACCH) and other channels as known to those skilled in the art. The Radio Resource sublayer 12 uses the services of the Data Link Layer 20 as the Signaling Layer 20 in the Physical Link Layer 22, while the packet logic channels PBCCH, PCCCH (including the PPCH, PHECH and PRACH), PACCH and PDTCH are multiplexed onto the packet data physical channels on a per radio block basis, by techniques known to those skilled in the art.

The Radio Resource sublayer 12 allows the transfer of upper layer Protocol Data Units using the shared medium between different mobile units or stations (MS) and the network. The Radio Link Control/Medium Access Control function 14 supports an "unacknowledged operation" and "acknowledged operation," as known to those skilled in the art.

The Radio Link Control segments reassemble Logical Link Control Protocol Data Units into RLC/MAC blocks and allows Backward Error Correction (BEC) to enable selective retransmission of unsuccessfully delivered RLC/MAC blocks. In the RLC "acknowledged" mode of operation, the order of higher layer Protocol Data Units are preserved. The RLC can also allow link adaptation and provide incremental redundancy (IR).

Any medium access control (MAC) function enables multiple mobile stations to share a common transmission medium, such as several physical channels and use them in parallel with several time slots within a time division multiple access (TDMA) frame. When a mobile station originates access, the MAC function arbitrates between multiple mobile stations while simultaneously attempting to access a shared transmission medium. When a mobile station terminates access, the MAC function queues and schedules access attempts. Information flow between layers can be by service primitives using Service Access Points (SAP) and other functions and techniques known to those skilled in the art.

The Medium Access Control function allows the management of shared transmission resources, e.g., packet data physical channels and radio link connections on the packet data physical channels. It also supports Temporary Block Flows (TBFs) and allows point-to-point transfer of signaling and user data within a cell between the network and mobile station, as known to those skilled in the art. The Medium Access Control function also allows reception of PBCCH and PCCCH to permit autonomous cell reselection performed by a mobile station.

Throughout this description, a Temporary Block Flow (TBF) can be described as a physical connection used by two Radio Resource support entities that support the unidirectional transfer of Logical Link Control Protocol Data Units (LLC PDU) on packet data physical channels. A Temporary Block Flow can also be described as an allocated radio resource on one or more packet data channels, using a number of RLC/MAC blocks that carry one or more LLC PDUs. A Temporary Block Flow is maintained only for the duration of data transfer until there are no more RLC/MAC blocks to be transmitted. In any RLC "acknowledge" mode, the transmitted RLC/MAC blocks are successfully acknowledged by a receiver. A TBF is assigned a Temporary Flow Identity (TFI) by the network. A mobile station assumes that the Temporary Flow Identity value is unique among concurrent TBF's in either an uplink or downlink direction on all packet data channels. The same TFI value can be used for TBF's on the packet data channels in the same direction and for TBFs in the opposite direction. An RLC/MAC block can be Temporary Flow Identity when it is relegated with a Temporary Block Flow (TBF).

The Radio Link Control interfaces primitives allow transfer of Logical Link Control Layer Protocol Data Units between the Logical Link Control Layer 16 and the Medium Access Control function. It performs segmentation of the Protocol Data Units into RLC data blocks and reassembles these data blocks into the Logical Link Control Protocol Data Units. RLC/MAC control messages can be segmented into RLC/MAC control blocks and reassembled from the control blocks. Selected transmission of RLC data blocks are enabled using Backward Error Correction (BEC). A Temporary Block Flow (TBF) uses two peer entities which are RLC end points having a receiver that receives RLC/MAC blocks. Each RLC end point could also have a transmitter that transmits the RLC/MAC blocks. As known to those skilled in the art, an end point receiver would have a receive window size that could be defined by a receive state variable. The end point transmitter could have a transmit window size that could be defined by a Send State Variable.

In the current prior art function, Protocol Data Units for the Logical Link Control are segmented to allow transport of the Protocol Data Units that are larger than the data field of a single RLC data block. If the contents of the LLC PDU do not fill an integer number of RLC data blocks, the next Protocol Data Unit is placed within a final RLC data block of the first LLC PDU, with no padding or spacing between the end of the first LLC PDU and the beginning of the next. If the final LLC PDU in the TBF does not fill an integer number of RLC data blocks, then filler octets are used to fill the remainder of the RLC data blocks.

Any received (and segmented) LLC PDUs are placed into RLC data blocks in the same order as they are received from higher layers. A Block Sequence Number (BSN) is included within the header of each RLC data block to number the RLC data block. The RLC data blocks are numbered consecutively (modulus) to allow reassembly of the LLC PDUs on the receiving side. It is usually transmitted over the physical link, and if it is necessary to retransmit the RLC data block, it is retransmitted using the same channel coding scheme, Block Sequence Number (BSN), and other details, as in the previous transmission.

Any RLC data blocks are collected at a receiver until all RLC data blocks forming the LLC PDU have been received. RLC headers are removed from each RLC data block at this time, and the RLC data units reassembled into an LLC PDU and passed to the higher layer.

The cellular or other telecommunication network can segment the RLC/MAC control messages into one or two RLC/MAC control blocks depending on the length of the RLC/MAC control message. When the contents of a control message do not fit an integer number of control blocks, filler octets are used to fill the remainder of the RLC/MAC control blocks. Typically, the last RLC/MAC control block containing elements of a control message contain filler octets. The final segment (FS) bit of the RLC/MAC control block header is set according to whether an RLC/MAC control block contains a final segment of the control message.

Mobile stations typically do not segment RLC/MAC control messages. RLC/MAC control blocks are collected at a receiver until all RLC/MAC control blocks forming the control message have been received. A mobile station is typically capable of receiving parallel RLC/MAC control messages.

Different RLC/MAC block structures can be defined for data transfers and control message transfers. They can be different for the two standards, GPRS and EGPRS. Usually, the RLC/MAC block for data transfer uses a MAC header and an RLC data block, in turn using an RLC header, RLC data unit, and spare bits, or a combined RLC/MAC header and one or two RLC data blocks.

As known to those skilled in the art, each RLC data block contains octets from one or more LLC PDUs. Depending on the modulation encoding scheme, one or two RLC data blocks are contained in one RLC/MAC block. Different header types can be defined depending on whether the transmission is an uplink or downlink. The type of header depends on the modulation encoding scheme (MCS-1 through MCS-9). Different components of an RLC/MAC block carrying any data block or a control block are assembled sequentially. It can include an integer or non-integer number of octets depending on the type of data block.

An RLC data block is formed in a different manner depending on whether it is formed in a GPRS or EGPRS RLC data block. An EGPRS RLC data block has a Final Block Indicator (FBI) bit for the downlink or an uplink. The TI (TLLI indication) field and extension (E) field are followed by an EGPRS RLC data unit. This data unit can be a sequence of octets that are numbered from 1 to N2. It should be understood that the octets of this data unit are not necessarily aligned with the octets of an RLC/MAC block. The octets can span across the boundary between two consecutive octets of an RLC/MAC block. The size of each data unit for various channel coding schemes can vary with 22 octets to as high as 2×74 octets.

In a header field, any temporary flow identity (TFI) field identifies the temporary block flow (TBF) in the RLC data blocks to which the RLC data block belongs. For the downlink and uplink TFI, it is typically about 5 bits in length and encoded as a binary number with a range 0 to 31. In a downlink RLC/MAC control block, the TFI identifies the temporary block flow (TBF) to which the RLC/MAC control message contained in the downlink RLC/MAC control block relates. This field indicates the mobile station to which the control message is addressed. The mobile stations analyze the distribution contents, depending on the protocol state. When this field is present and the contents of the control message contain a TFI addressing the mobile station, the mobile station can ignore the TFI in the control message contents. If this field is not present, all mobile stations can interpret the contents of the control message. The power reduction (PR) field indicates the power level reduction of a current RLC block.

A final block indicator (FBI) bit indicates that the downlink RLC data block is the last RLC data block of the downlink TBF. When the bit is zero, the current block is not the last RLC data block in the TBF. When the bit is one, the current block is the last RLC data block in the TBF.

The extension bit (E) indicate the presence of an optional octet in the RLC data block header. When it is zero, the extension octet follows immediately. When it is one, no extension octet follows. The extension bit after the TFI field is used for extensions of the protocol by allowing optional octets in the RLC data block header A block sequence number (BSN) field carries the modulo sequence number(s) for each RLC data block within the TBF. It is typically 11 bits in lengths and is encoded as a binary number with range 0 to 2,047, in the EGPRS standard.

In one example, the data block header includes a more M bit (M) field to indicate when another logical link control protocol data unit follows the current one within a radio link control data block.

The length indicator (LI) field delimits the logical link control protocol data unit within the radio link control data block. The first length indicator indicates the number of octets of the RLC data field belonging to the first LLC PDU. The second length indicator indicates the number of octets of the RLC data field belonging to the second LLC PDU. This continues on.

In accordance with the present invention, the length indicator is used to delimit the LLC PDUs within the RLC data block as described before. The first length indicator can indicate the number of octets of an RLC data field belonging to the first LLC PDU and the second length indicator can indicate the number of octets of the RLC data field belonging to the second LLC PDU and so on. Only the last segment of any LLC PDU shall be identified with the length indicator. The length indicator shall be placed in the RLC data block with the last segment of the LLC PDU, unless the LLC PDU without the corresponding L1 octet fills the RLC data block precisely. In that case, the length indicator shall be placed as the first length indicator in the next in sequence RLC data block and take the value zero, having no data.

The final RLC data block of a TBF shall have a length indicator field corresponding to the final LLC PDU unless the final LLC PDU fills the RLC data block precisely. If the final LLC PDU fills the RLC data block precisely, the final LLC PDU shall be sent without a corresponding length indicator field. If the final LLC PDU does not fill the RLC data block, a final length indicator field shall be included in the RLC data block and take the value 127 (111 1111), indicating that there is no following LLC PDU.

The length indicator field can be seven bits in length and can be encoded as a binary number. The valid values are the values ranging from 0–74 and the value 127. Other values are reserved. A mobile station detecting a reserved LI value or an inconsistent encoding of the LI and E fields shall ignore all fields of the RLC/MAC block, except the USF field.

Figure 2B:
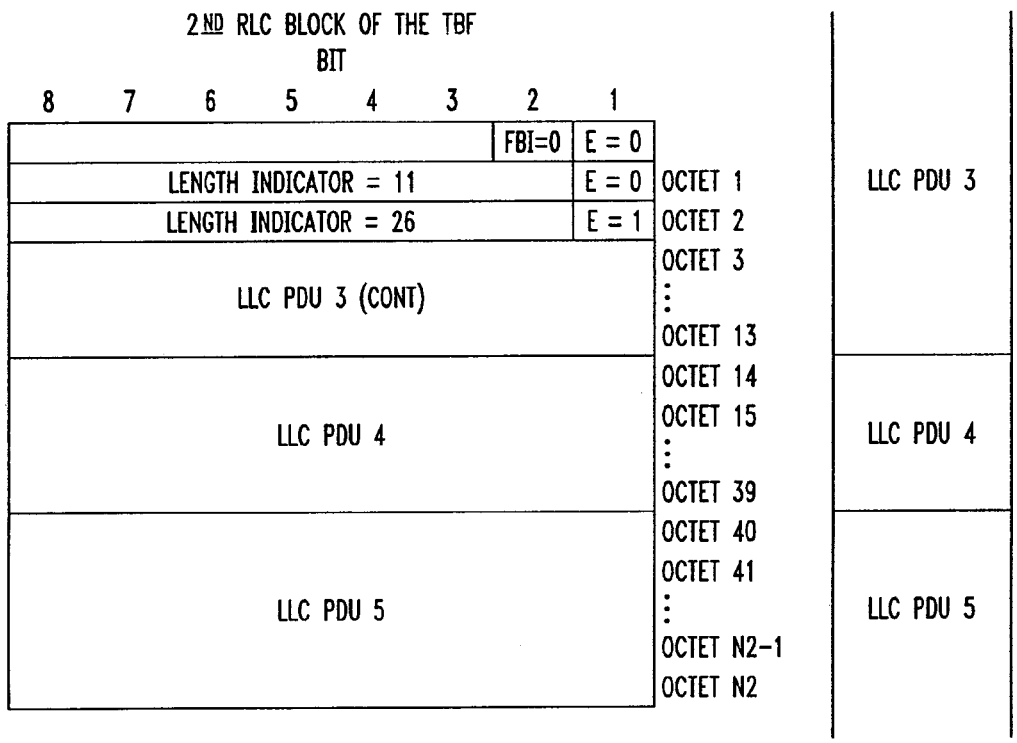
Figure 2C:
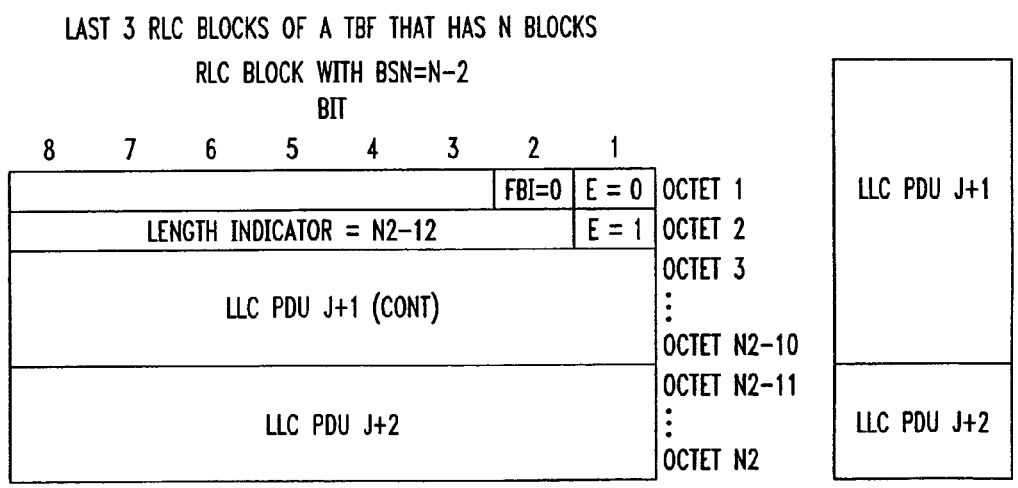
Figure 3A:
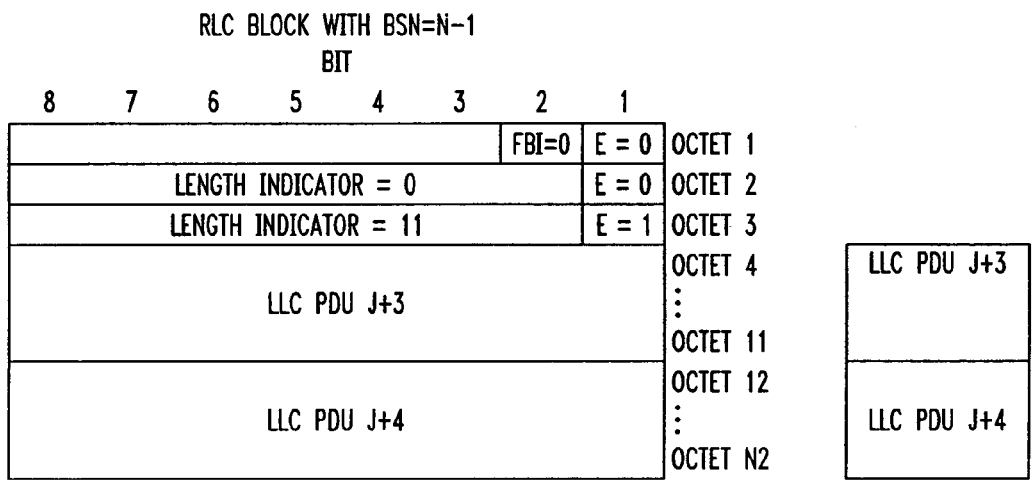
Figure 3B:
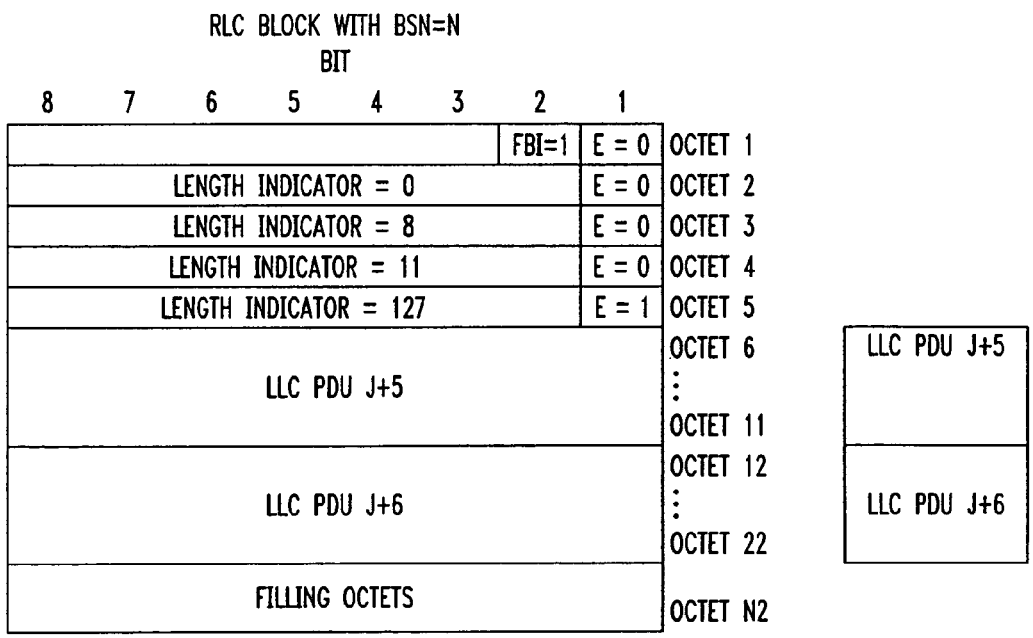
Figures 4, 5A:
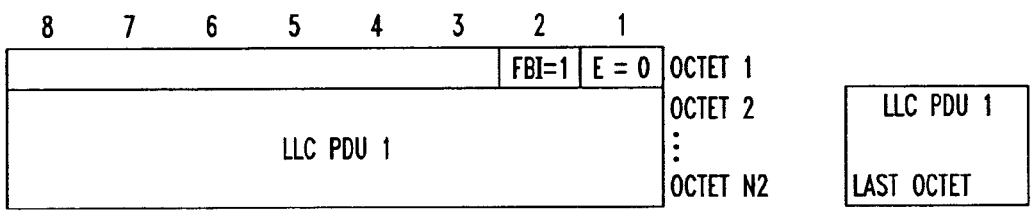

There are now illustrated examples for delimitation of Logical Link Control Protocol Data Units in Radio Link Control in RLC data blocks, such as in the EGPRS mode for a downlink configuration (FIGS. 2A, 2B, 2C, 3A, 3B and 4) and another example with details of Delimitation of LLC PDU in EGPRS RLC data block (FIGS. 5A, 5B, 6A–C, and 7), in accordance with the present invention. For example, FIGS. 2A and 2B show the first two RLC blocks of a TBF of the present invention in downlink. FIGS. 2C, 3A and 3B show the last three RLC blocks of a TBF that is in the blocks. FIG. 4 shows the end of a TBF where the RLC block with BSN equals zero mod SNS in the TBF. The last LLC PDU requires no delimiter and the last LLC PDU fills the rest of the RLC data block. The length indicator can be zero as the first LN and the next sequence RLC data block. This simplifies the rule for delimiting and saves one octet in case the last segment of the LLC PDU fills exactly the RLC data block.

FIGS. 5A, SB, 6A, 6B, 6C and 7 disclose another example of delimitation of LLC PDU in the EGPRS RLC data block for the downlink configuration similar to those figures shown in FIGS. 2A, 2B, 2C, 3A, 3B and 4.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A telecommunications system comprising: a telecommunications network device having a radio interface and a layered protocol architecture for allowing transfer of upper layer Protocol Data units using a shared medium between a communications unit and the telecommunications network device, wherein said layered protocol architecture is operative for coding and transferring Protocol Data Units as a plurality of Radio Link Control data blocks that each carry at least one Logical Link Control Protocol Data Unit (LLC PDU) and a data block header that includes a delimiter as a length indicator (LI), wherein any last Logical Link Control Protocol Data Unit of a Radio Link Control data block has no delimiter and when a last Logical Link Control Protocol Data Unit fills the balance of the Radio Link Control data block, the length indicator is zero having no data for a first length indicator in any next in sequence Radio Link Control data block, wherein said data block header includes a Final Block Indicator (FBI) field to indicate whether the Radio Link Control data block is the last data block of a Temporary Block Flow.

2. A telecommunications system according to claim 1, and further comprising at least one packet data physical channel through which Protocol Data Units are transferred, wherein said layered protocol architecture further comprises a radio resource sublayer for managing the at least one packet data physical channels and managing Radio Link Control and Medium Access Control on the packet data physical channels.

3. A telecommunications system according to claim 1, wherein said Radio Link Control data block further comprises a dowulink Radio Link Control data block.

4. A telecommunications system according to claim 1, wherein data block header includes an extension bit (E) field to indicate the presence of an optional octet in the data block header.

5. A telecommunications system according to claim 1, wherein said data block header includes a More bit (M) field to indicate when another Logical Link Control Protocol Data Unit follows the current one within a Radio Link Control data block.

6. A telecommunications system according to claim 1, wherein a communications unit further comprises at least one mobile unit.

7. A telecommunications system according to claim 1, wherein said telecommunications network device further comprises base stations.

8. A telecommunications system comprising: a plurality of telecommunications network devices each having a radio interface and a layered protocol architecture for allowing transfer of upper layer Protocol Data Units using a shared medium between communications units and the telecommunications network devices, wherein said layered protocol architecture is operative for coding and transferring Protocol Data Units as a plurality of Radio Link Control data blocks each containing octets numbered from 1 to N2 and each carrying a plurality of Logical Link Control Protocol Data Units (LLC PDU) having user data or upper layers' signaling data and a data block header that includes a delimiter as a length indicator (LI) given in an octet, wherein any last Logical Link Control Protocol Data Unit of a Radio Link Control data block has no delimiter, and when a last Logical Link Control Protocol Data Unit fills the balance of a Radio Link Control data block, the length indicator is zero for a first length indicator in any next in sequence Radio Link Control data block, wherein said data block header includes a Final Block Indicator (FBI) field to indicate whether the Radio Link Control data block is the last data block of a Temporary Block Flow.

9. A telecommunications system according to claim 8, and further comprising at least one packet data physical channel through Protocol Data Units are transferred, wherein said layered protocol architecture further comprises a radio resource sublayer for managing the at least one packet data physical channel and managing Radio Link Control and Medium Access Control on the packet data physical channels.

10. A telecommunications system according to claim 8, wherein said Radio Link Control data block further comprises a downlink Radio Link Control data block.

11. A telecommunications system according to claim 8, wherein said data block header includes an extension bit (E) field to indicate the presence of an optional octet in data block header.

12. A telecommunications system according to claim 8, wherein said data block header includes a More bit (M) field to indicate when another Logical Link Control Protocol Data Unit follows the current one within a Radio Link Control data block.

13. A telecommunications system according to claim 8, wherein said communications units further comprise at least one mobile unit.

14. A telecommunications system according to claim 8, wherein said telecommunications network devices further comprise a plurality of base stations.

15. A network device comprising: a radio interface; and a layered protocol architecture for allowing transfer of upper layer Protocol Data Units, wherein said layered protocol architecture is operative for coding and transferring Protocol Data Units as a plurality of Radio Link Control data blocks that each carry at least one Logical link Control Protocol Data Unit (LLC PDU) and a data block header that includes a delimiter as a length indicator (LI), wherein any last Logical link Control Protocol Data Unit of a Radio link Control data block has no delimiter, and when a last Logical link Control Protocol Data Unit fills the balance of a Radio Link Control data block, the length indicator is zero for a first length indicator in any next in sequence Radio Link Control data block, wherein said data block header includes a Final Block Indicator (FBI) field indicative of whether the Radio Link Control data block is the last data block of a Temporary Block Flow.

16. A network device according to claim 15, and further comprising at least one packet data physical channel through which Protocol Data Units are transferred, wherein said layered protocol architecture further comprises a radio resource sublayer for managing the at least one packet data physical channel and managing Radio Link Control and Medium Access Control on the packet data physical channel.

17. A network device according to claim 15, wherein said Radio link Control data block further comprises a downlink Radio Link Control data block.

18. A network device according to claim 15, wherein the data block header includes an extension bit (E) field to indicate the presence of an optional octet in data block header.

19. A network device according to claim 15, wherein said data block header includes a More bit (M) field to indicate when another Logical Link Control Protocol Data Unit follows the current one within a Radio Link Control data block.

20. A network device according to claim 15, wherein said communications units further comprise at least one mobile unit.

21. A network device according, to claim 15, wherein said telecommunications network devices further comprise a plurality of base stations.

* * * * *